(No Model.)
W. C. FRICK.
HANDLE FOR AGRICULTURAL IMPLEMENTS.
No. 565,887. Patented Aug. 18, 1896.
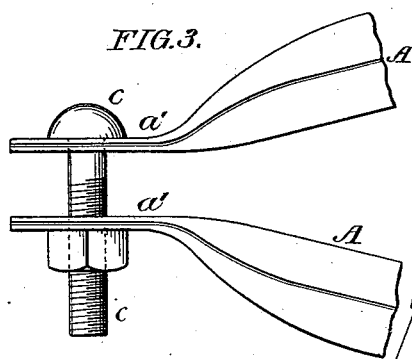
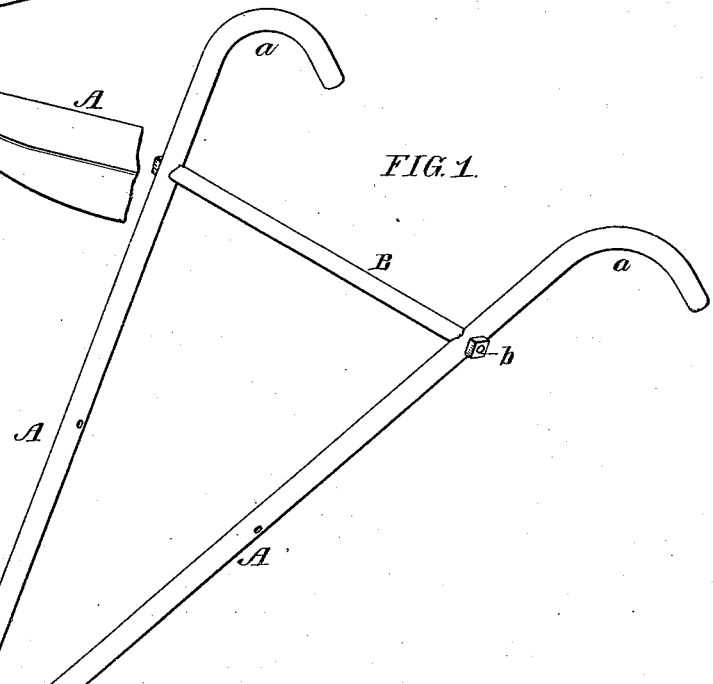
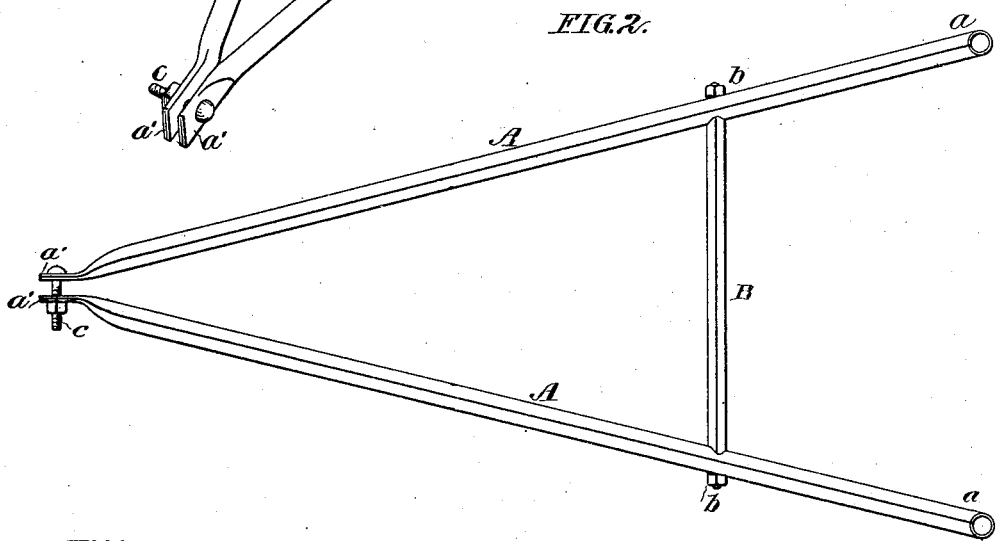
Witnesses:
Hamilton D. Turner
Will. A. Barr
Inventor:
William C. Frick
by his Attorneys
Howson & Howson

UNITED STATES PATENT OFFICE.

WILLIAM C. FRICK, OF DANVILLE, PENNSYLVANIA.

HANDLE FOR AGRICULTURAL IMPLEMENTS.

SPECIFICATION forming part of Letters Patent No. 565,887, dated August 18, 1896.

Application filed February 28, 1895. Serial No. 540,063. (No model.)

*To all whom it may concern:*

Be it known that I, WILLIAM C. FRICK, a citizen of the United States, and a resident of Danville, Montour county, Pennsylvania, have invented certain Improvements in Handles for Agricultural Implements, &c., of which the following is a specification.

The object of my invention is to make a cheap and substantial handle or handles for agricultural implements, trucks, &c., of steel tubing, as fully described hereinafter, reference being had to the accompanying drawings, in which—

Figure 1 is a perspective view of a handle of an agricultural implement, a cultivator in the present instance. Fig. 2 is an inverted plan view showing the seam, and Fig. 3 is an enlarged view of the end of the handle to be joined to the frame of the cultivator.

Heretofore in the manufacture of handles wood has usually been preferred, owing to its stiffness and the ease by which it can be shaped.

By my invention steel is utilized (preferably high in carbon) for the manufacture of my improved handle, and this steel is bent in the form of a tube with the abutting edges unwelded. The tubes are made a certain length and have the necessary holes for the bolts punched therein, as shown in Fig. 1. Each handle A A is secured to the frame of the implement by a bolt *c*, and the upper end of each handle is bent at *a*, so as to form convenient handholds. In making this bend I arrange the seam of the tube on the under side, so that as the tube is bent the free edges of the tube take the crimp and prevent buckling and the straining of the upper or outer section of the tube to a great extent. Thus I am enabled to make a bend which will not weaken the handle to any considerable degree. The opposite end *a'* of each tube is flattened in such a manner that the seam will be at the edge, as shown in Fig. 3. Thus the tubes can be readily flattened without undue cracking.

The handles are secured together by a bolt *b*, which extends through a brace-tube B, preferably of the same material as the tubes A A, as this material will resist end pressure. The ends of the tube B are shaped so as to conform to the sides of the tubes A, as shown in the drawings.

While I have shown one brace connecting the tubular handles A A, a series of braces may be used when extra strength is necessary.

When the handle is made complete, as shown in Fig. 1, I galvanize the entire handle, both inside the tubes and out, thus closing the seams and joints, and preventing rusting to a great extent. The tube, while it is made very cheaply, is much stronger than the ordinary welded tube, and the galvanizing of the handle after finishing gains the same result in regard to rusting as the ordinary closed tube.

I claim as my invention—

A handle for agricultural implements, composed of two unwelded tubes A A of steel, each flattened at one end, and curved at the opposite end, with the seam on the under side, and one or more transverse tension and compression members confining tubes A A, substantially as described.

In testimony whereof I have signed my name to this specification in the presence of two subscribing witnesses.

WILLIAM C. FRICK.

Witnesses:
WILL. A. BARR,
JOSEPH H. KLEIN.